United States Patent
Mao

(10) Patent No.: US 8,831,661 B2
(45) Date of Patent: Sep. 9, 2014

(54) METHOD, SYSTEM AND APPARATUS FOR CONTACTING A TARGET MOBILE STATION USING A SECONDARY CONNECTION

(75) Inventor: Ronald Xuzhuang Mao, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 176 days.

(21) Appl. No.: 13/398,497

(22) Filed: Feb. 16, 2012

(65) Prior Publication Data

US 2012/0214531 A1     Aug. 23, 2012

Related U.S. Application Data

(60) Provisional application No. 61/444,441, filed on Feb. 18, 2011.

(51) Int. Cl.
*H04B 7/00*     (2006.01)
*H04W 68/02*     (2009.01)

(52) U.S. Cl.
CPC .................................. *H04W 68/02* (2013.01)
USPC .......... 455/517; 455/38.1; 455/445; 455/423; 455/425; 455/432.1

(58) Field of Classification Search
CPC ..... H04W 12/06; H04W 16/26; H04W 28/18; H04W 36/0083; H04W 48/18; H04W 48/20; H04W 60/04; H04W 76/025; H04W 92/045; H04L 9/0838; H04L 9/3273; G01S 5/10; H04B 7/15528
USPC .............. 455/38.1, 445, 423.425, 432.1, 434, 455/517; 444/436, 438; 370/335, 236, 462
See application file for complete search history.

(56) References Cited

U.S. PATENT DOCUMENTS

| | | | | |
|---|---|---|---|---|
| 5,392,452 A | * | 2/1995 | Davis | 340/7.3 |
| 6,785,510 B2 | * | 8/2004 | Larsen | 455/11.1 |
| 7,092,434 B2 | * | 8/2006 | Moon et al. | 375/211 |
| 7,512,402 B2 | * | 3/2009 | Narayanaswami et al. | 455/420 |

(Continued)

FOREIGN PATENT DOCUMENTS

| | | |
|---|---|---|
| CN | 101288276 A | 8/2006 |
| CN | 101867515 A | 10/2010 |
| JP | 2003304572 A | 10/2003 |
| WO | WO 2009/125948 A2 | 10/2009 |

OTHER PUBLICATIONS

International Search Report, PCT/CN2012/071322 filed Feb. 20, 2012, mailed May 24, 2012, 10 pages.

(Continued)

*Primary Examiner* — Fayyaz Alam
*Assistant Examiner* — Max Mathew
(74) *Attorney, Agent, or Firm* — Slater & Matsil, L.L.P.

(57) ABSTRACT

A method and system for notifying a target mobile station, which is temporarily out of communication with a network device over a primary connection, are provided. By way of example, one method includes receiving a notification from the network device over the primary connection. The notification indicates that data is available for the target mobile station. The notification is transmitted to the target mobile station over a secondary connection. The notification requests or instructs the target mobile station to establish communication with the network device over the primary connection in order to receive the data.

20 Claims, 5 Drawing Sheets

(56) References Cited

U.S. PATENT DOCUMENTS

| | | |
|---|---|---|
| 8,112,125 B2 * | 2/2012 | Bailey, II .................... 455/569.1 |
| 2004/0192204 A1 * | 9/2004 | Periyalwar et al. ............. 455/25 |
| 2006/0013160 A1 * | 1/2006 | Haartsen ....................... 370/328 |
| 2006/0205408 A1 * | 9/2006 | Nakagawa et al. ............ 455/445 |
| 2009/0040985 A1 * | 2/2009 | Barnawi et al. ............... 370/336 |
| 2011/0034145 A1 * | 2/2011 | Youn et al. ................. 455/404.1 |

OTHER PUBLICATIONS

Mao, R., et al., "Wireless Broadband Architecture Supporting Advanced Metering Infrastructure," IEEE, Feb. 2011, 13 pages.

IEEE 802.16 Broadband Wireless Access Working Group, Aug. 2, 2011, 187 pages.

* cited by examiner

METHOD, SYSTEM AND APPARATUS FOR CONTACTING A TARGET MOBILE STATION USING A SECONDARY CONNECTION

CROSS-REFERENCE TO RELATED APPLICATIONS

This application claims the benefit of U.S. Provisional Application No. 61/444,441, filed on Feb. 18, 2011, entitled "Method, System and Apparatus for Supporting Secondary Connection," which application is hereby incorporated herein by reference.

TECHNICAL FIELD

The present invention relates to communications systems and methods, and, in particular embodiments, to a method, system and apparatus for supporting a secondary connection.

BACKGROUND

Machine-to-Machine (M2M) refers to technologies that allow both wireless and wired systems to communicate with other devices of the same ability. For example, M2M uses a device (such as a sensor or meter) to capture an event (such as temperature, inventory level, etc.). The captured event is relayed through a network (wireless, wired or hybrid) to an application (software program) that translates the captured event into meaningful information (for example, items need to be restocked). Such communication was originally accomplished by having a remote network of machines relay information back to a central hub for analysis, which would then be rerouted into a system like a personal computer.

In some circumstances, the devices associated with an M2M network are configured to enter a sleep or idle mode in an effort to conserve network resources. However, even in the sleep or idle mode the devices consume network resources (e.g., bandwidth over a cellular connection).

In some circumstances, the devices associated with an M2M network are configured to periodically access the M2M network in an effort to conserve network resources. In other words, each of the devices only communicates with the M2M network according to a predetermined access period or at a scheduled interval. Outside of the access period, the network is unable to notify, active, or communicate with the particular device. While this solution permits the network to support a large number of devices, the solution is not without its drawbacks. Indeed, outside the access period allotted for a particular device the network is unable to communicate with that device. Therefore, the delivery of any data, notifications, information, and so forth intended for that device is undesirably delayed.

SUMMARY

An embodiment method of notifying a target mobile station temporarily out of communication with a network device over a primary connection includes receiving a notification from the network device over the primary connection, the notification indicating that data is available for the target mobile station and transmitting the notification to the target mobile station over a secondary connection. The notification requests that the target mobile station establish communication with the network device over the primary connection in order to receive the data.

An embodiment method of receiving notice from a neighbor mobile station while temporarily out of communication with a network device over a primary connection includes receiving a notification from the neighbor mobile station over a secondary connection. The notification indicates that data is available for the target mobile station. The method also includes establishing communication with the network device over the primary connection in accordance with the notification in order to receive the data.

An embodiment method of notifying a target mobile station temporarily out of communication over a primary connection using a neighbor mobile station. The method includes transmitting a notification to the neighbor mobile station over a primary connection. The notification instructs the neighbor mobile station to relay the notification to the target mobile station through a secondary connection and indicates that data is available for the target mobile station. The method also includes receiving a request from the target mobile station to establish communication over the primary connection in order to transfer the data. The request is in accordance with the notification delivered to the target mobile station by the neighbor mobile station through the secondary connection.

An embodiment wireless communications device includes a processor, an input/output port configured to provide data to the processor, a memory configured to store the data received via the input/output port, and a notification module disposed in the processor. The notification module is adapted to process a notification received from a neighbor device over a secondary connection and to initiate a request for communication with a network device over a primary connection in response to the notification received.

An embodiment wireless communications device includes a processor, an input/output port configured to provide data to the processor, a memory configured to store the data received via the input/output port, and a topology module disposed in the processor. The topology module is adapted to identify a mobile station suitable for relaying a notification to a target mobile station over a secondary connection in accordance with topology information received via the input/output port and to initiate transmission of the notification to the mobile station over a primary connection.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to a specific context, namely a wireless communications system that supports communications devices with data capability, i.e., third-generation (3G) and fourth-generation (4G) communications devices. The concepts of the present disclosure may also be applied, however, to wireless communications systems that support data capable communications devices in general.

Figure 1:
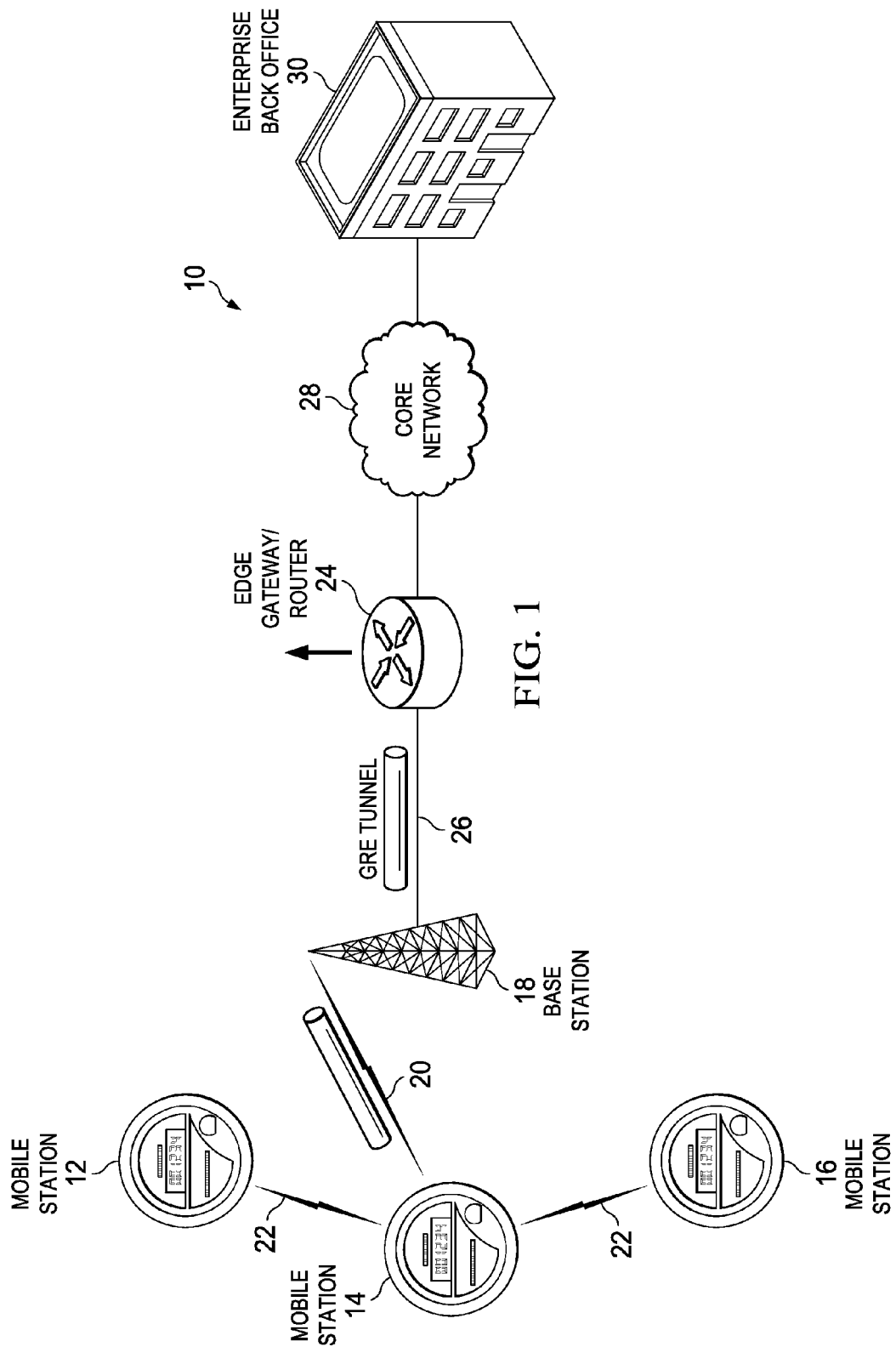
FIG. 1 is a simplified schematic of a network including a base station, a target mobile station, and neighbor mobile stations.

Referring now to FIG. 1, a simplified schematic of a network 10 capable of utilizing aspects of the present disclosure is illustrated. As will be more fully explained below, the present disclosure proposes a solution that enables a notification to be delivered to a mobile station that is temporarily disconnected from the network 10 over a primary communication path.

As shown in FIG. 1, the network 10 includes several mobile stations (MS) 12, 14, 16 and a base station (BS) 18. The mobile stations 12, 14, 16 may be, for example, smart meters, weather stations, or some other device configured to autonomously sense or monitor an event or events and report back to the base station 18 with little or no human intervention. Despite three mobile stations 12, 14, 16 being illustrated in FIG. 1, more or fewer of the mobile stations 12, 14, 16 may be associated with the network 10 and/or intermittently communicating with base station 18.

As depicted in FIG. 1, a communication path or primary connection 20 (e.g., a cellular link) exists between one of the mobile stations 14 and the base station 18. In other words, the mobile station 14 is in a connected state. In contrast, a communication path does not presently exist between the other mobile stations 12, 16 and the base station 14. Indeed, the mobile stations 12, 16 are temporarily disconnected from the base station 18 over the primary connection 20. Therefore, the mobile stations 12, 16 are said to be in a disconnected state. While not shown in FIG. 1, mobile station 16, for example, could also be in a connected state over primary connection 20 but in a "sleep" or "idle" mode to conserve the resources of the primary connection.

Still referring to FIG. 1, a secondary communication path or secondary connection 22 exists (or is capable of existing) between the mobile stations 12, 14, 16. In an embodiment, the various mobile stations 12, 14, 16 are able to continuously monitor the secondary connection 22. The secondary connection 22 may be, for example, a wireless access connection that supports direct peer-to-peer (P2P) communication over unlicensed spectrum (e.g., wireless fidelity (WiFi), Zigbee, etc.). In an embodiment, the secondary connection 20 operates via a particular wireless standard such as, for example, 802.16e, 802.16m, or both. The secondary connection 22 may also be a wired connection over power lines (e.g., powerline communication) or another type of wired connection. In an embodiment, the secondary connection 22 is a combination of wireless and wired connections.

The base station 18 is configured to communicate with, for example, an edge gateway or router 24 via a generic routing encapsulation (GRE) tunnel 26. The edge gateway/router 24 is operably coupled to a core network 28. Therefore, communications can be transferred through the network 10 to an enterprise back office 30 or whatever other destination is intended for the communications. Those skilled in the art will appreciate that the network 10 of FIG. 1 may include numerous other network components and hardware in other embodiments which, for ease of illustration, have been intentionally omitted.

Figure 2A:
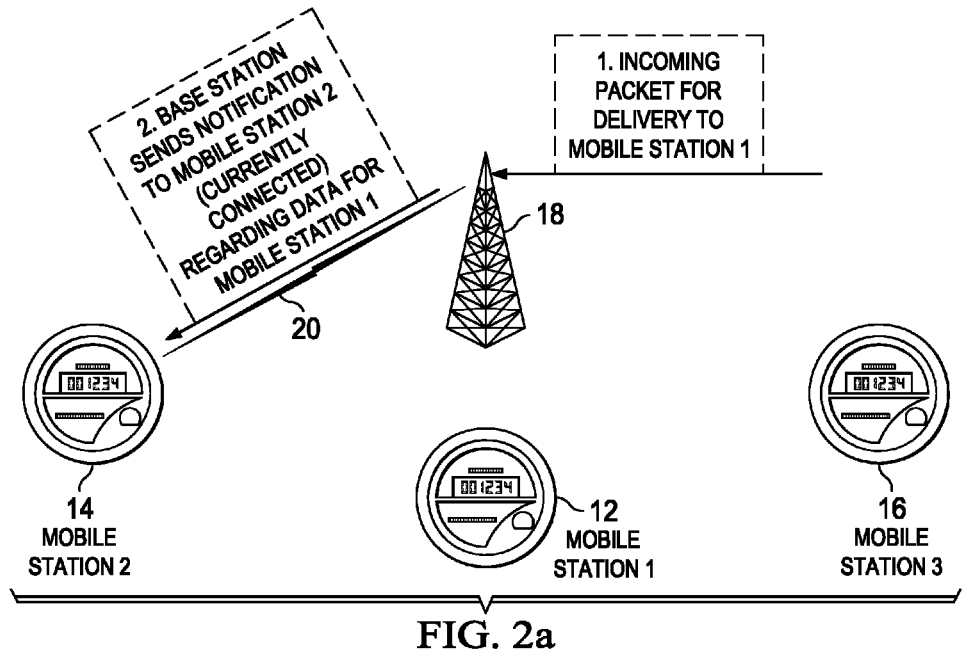
FIGS. 2a-2c collectively illustrate the manner in which a disconnected mobile station from FIG. 1 can be activated using a secondary communication path.
Figure 2B:
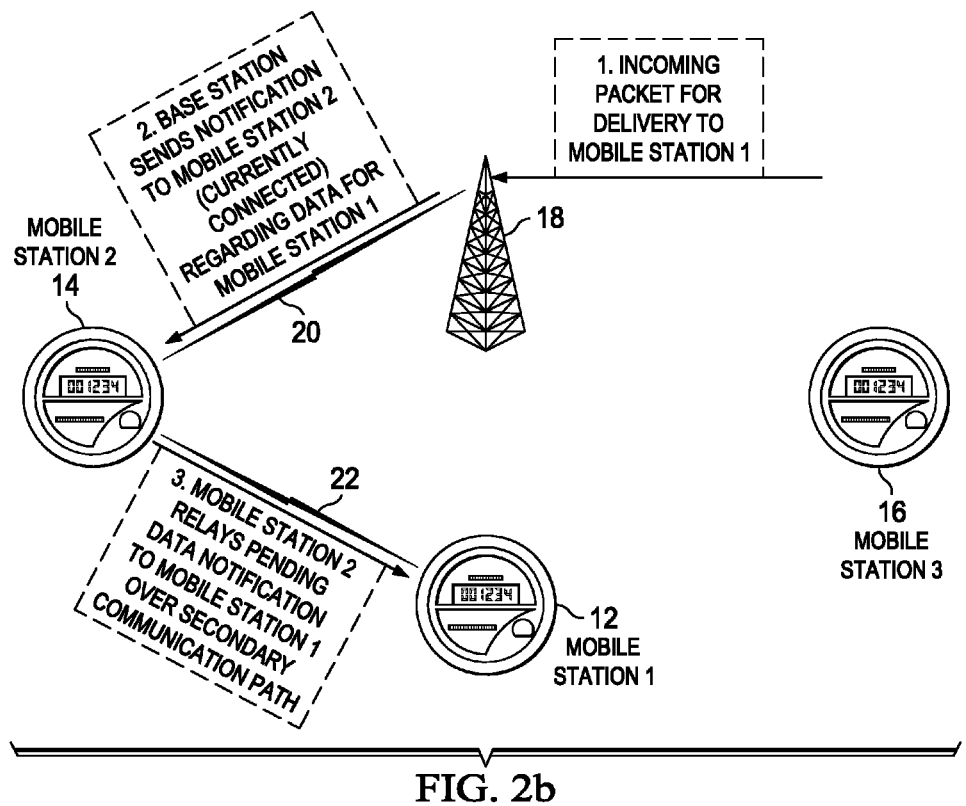
Figure 2C:
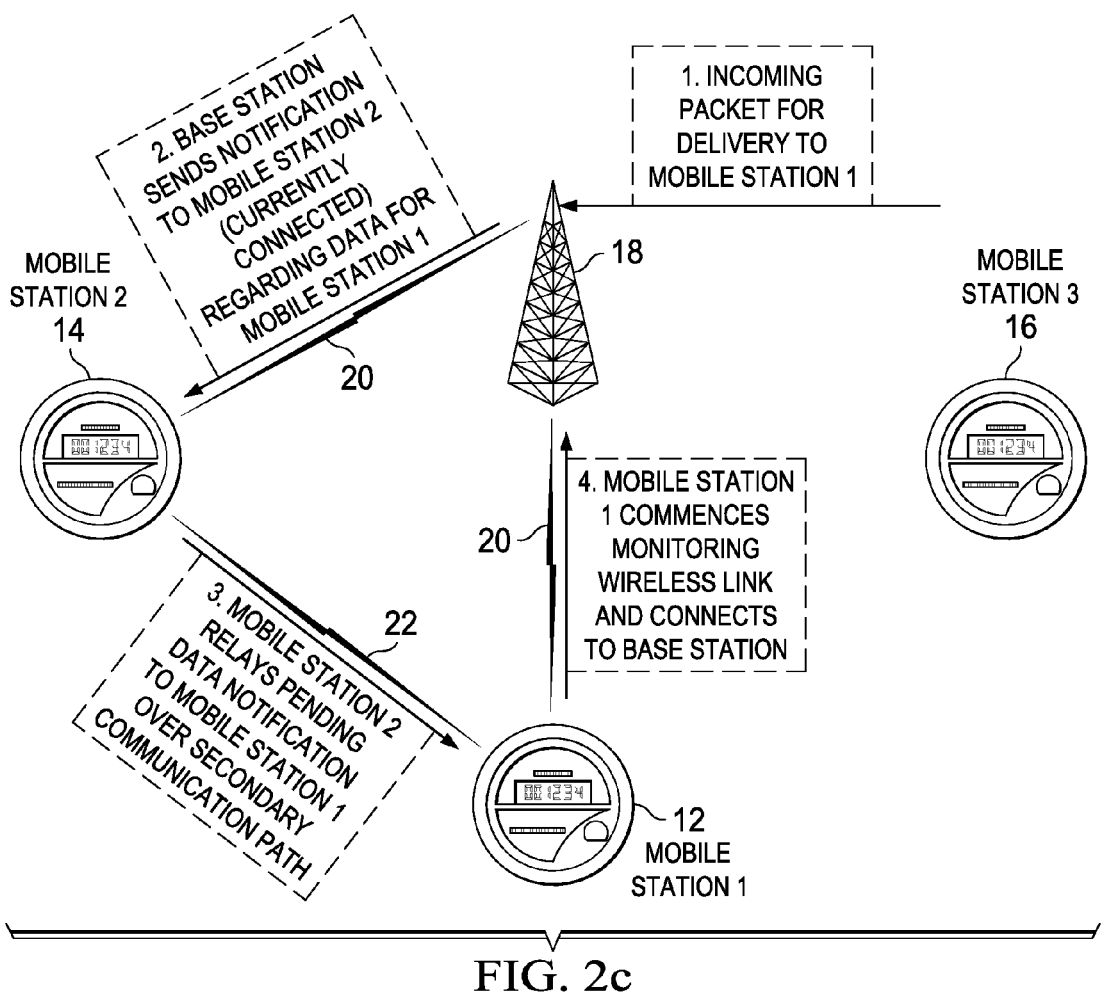

Referring now to FIGS. 2a-2c, the base station 18 and mobile stations 12, 14, 16 of network 10 from FIG. 1 are illustrated in further detail and apart from the network as a whole. As will be more fully explained below, FIGS. 2a-2c collectively illustrate the manner in which a disconnected mobile station (e.g., MS 1) can be activated using a secondary communication path (between MS 2 and MS 1). As shown in FIG. 2a, the base station 18 receives an incoming data packet intended for delivery to mobile station 12, which is referred to herein as a target mobile station (labeled as MS 1). When the data packet is received by the base station 18, the target mobile station 12 is temporarily disconnected from the base station 18 over a primary connection 20. In other words, the data packet has been received by the base station 18 outside the access period allocated to the target mobile station 12.

Because the target mobile station 12 is not connected to the base station 18 over the primary connection 20 when the data packet is received, as shown in FIG. 2a the base station 18 transmits a notification (i.e., an indication) to another mobile station 14, which is referred to as a neighbor mobile station (labeled as MS 2). As shown, the neighbor mobile station 14 is currently connected to the base station 18 via the primary connection 20. The neighbor mobile station 14 is also configured to communicate with the target mobile station 18 through the secondary connection 22.

In an embodiment, the notification received by the neighbor base station 18 includes an identification of the target base station 12 as the intended recipient of the data packet at the base station 18. In addition, the notification includes an indication that the data packet is available to the target mobile station 12 at the base station 18 or the core network 28.

In an embodiment, the notification may also advise the target mobile station 12 to monitor the primary connection 20 to the base station 18. The notification may also include other information such as, for example, a specific request or instruction for the target base station 12 to establish or initiate communication with the base station 18 over the primary connection 20. The specific request or instruction may indicate that communication should be established as soon as possible, at a certain time, and so forth. In addition, the notification may contain priority information that the target mobile station 12 uses to determine whether to access or connect to the base station 18 on the primary connection 20.

While the notification could include the data packet intended for the target mobile station 12, in an embodiment the data itself is not transmitted to the neighbor mobile station 14 and subsequently relayed to the target mobile station 12 over the secondary connection 22 due to security concerns. In such an embodiment, the notification includes the request or instruction that the target mobile station 12 establish communication with the base station 18 over the primary connection 20, which may be more secure or better encrypted than the secondary connection 22.

In an embodiment, if the neighbor mobile station 14 is in an active mode, the base station forwards the notification on the data channel of the primary connection 20. If, however, the neighbor mobile station 14 is in an idle or sleep mode where the primary connection 20 still exists, the base station 18 forwards the notification on the paging channel of the primary connection. In an embodiment, for example, when topology information is not available, the base station 18 can find the neighbor mobile station 14 by looking up the neighbor configuration for the target mobile station 12 or by broadcasting the notification to the broadcast region that the target mobile station 12 belongs to or is associated with.

To allow the base station 18 to identify which of the mobile stations 14, 16 in FIG. 2a would be a suitable neighbor mobile station 14 (i.e., the best choice), topology information regarding secondary connections 22 (e.g., connectivity access) of the mobile stations 12, 14, 16 is made available at the core network 28. When the core network 28 receives data packets intended for the target mobile station 12, and knows the target mobile station 12 is presently temporarily disconnected, it retrieves the topology information from a database. The topology information may be used to identify the neighbor mobile station 14 best suited to relay the indication to the target mobile station 12. In FIG. 2a, the topology information identified the mobile station 14 as the best suited mobile station relative to the other mobile station 16 illustrated based on the topology information. In an embodiment, the topology information is made available to, or stored at, the base station 18.

Still referring to FIG. 2a, once the neighbor mobile station 14 receives the notification from the base station 18 over the primary connection 20, the neighbor mobile station 14 transmits or relays the notification to the target mobile station 12 over the secondary connection 22 as shown in FIG. 2b. Upon receipt of the notification, the target mobile station 12 establishes communication with the base station 18 over the primary connection 20 (or initiates or transmits a request to do so) as shown in FIG. 2c. Once communication between the base station 18 and the target mobile station 12 is established over the primary connection 20, the base station 18 is able to transmit the data packet to the target base station 12 over the primary connection 20.

In an embodiment, the core network 28 of FIG. 1 buffers the incoming data packet intended for the target mobile station 12 while the above transactions are occurring. In an embodiment, the base station 18 of FIG. 1 buffers the incoming data packet until such time as the data packet can be delivered to the target base station 12 over the primary connection 20.

In an embodiment, the base station 18 buffers the data packet until an alternate neighbor mobile station (e.g., mobile station 16) within reach of the target mobile station 12 enters into a connected state via the primary connection 20. In such cases, a more secure secondary connection 22 between the alternate mobile station 16 and the target mobile station 12 may justify transmission of the data packet (as opposed to only the notification) over the secondary connection.

Figure 3:
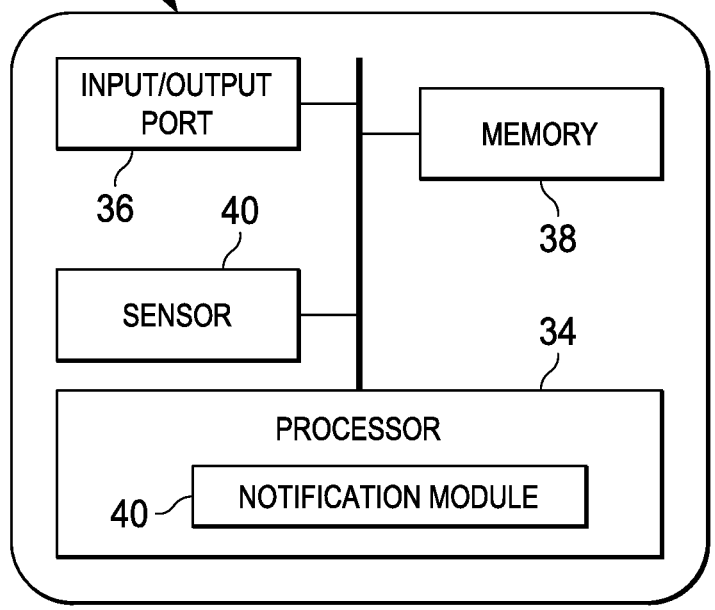
FIG. 3 is a simplified schematic of one of the mobile stations from FIG. 1.

Referring now to FIG. 3, a network communications device 32 is illustrated. In an embodiment, the device 32 is one of the mobile stations 12, 14, 16 illustrated in FIGS. 1-2a-c. The device 32 includes a processor 34, an input/output (I/O) port 36, a memory 38, and a sensor 40. The main processing is performed in the processor 34, which may be a microprocessor, digital signal processor or any other appropriate processing device. In one embodiment, the processor 34 can be used to implement the method steps described herein. For example, the processor can serve as a specific functional unit at different times to implement the subtasks involved in performing the techniques of the present disclosure. Alternatively, in an embodiment different hardware blocks (e.g., the same as or different than the processor 34) can be used to perform different functions. In other embodiments, some subtasks are performed by the processor 34 while others are performed using a separate circuitry.

In an embodiment, the processor 34 includes a notification module 42. The notification module 42 is generally adapted to process the notification received from the neighbor mobile station 14 over the secondary connection 22. The notification module 42 is also configured to initiate a request for communication and/or establish communication with the base station 18 over the primary connection 20 in response to the notification received. In other words, the notification module 42 interprets the notification and facilitates the relay processes as noted above.

Program code (e.g., the code implementing the algorithms disclosed above) and data can be stored in the memory 38 or any other non-transitory storage medium. The memory 38 can be local memory such as DRAM or mass storage such as a hard drive, optical drive or other storage (which may be local or remote). While the memory 38 is illustrated functionally with a single block, it is understood that one or more hardware blocks can be used to implement this function.

FIG. 3 also illustrates the I/O port 36, which can be used to provide the data to and from the processor 34. In the case of a wireless (e.g., mobile) device, the I/O port 36 may be coupled to an antenna. In the case of a wired device, the I/O port 36 may be connected to a network interface. The sensor 40 is also illustrated in FIG. 3. The sensor 40 may be any type of sensor or other detector, whether operated automatically, manually, or both. The sensor 40 block in FIG. 3 is provided to illustrate the source of the event being detected.

Figure 4:
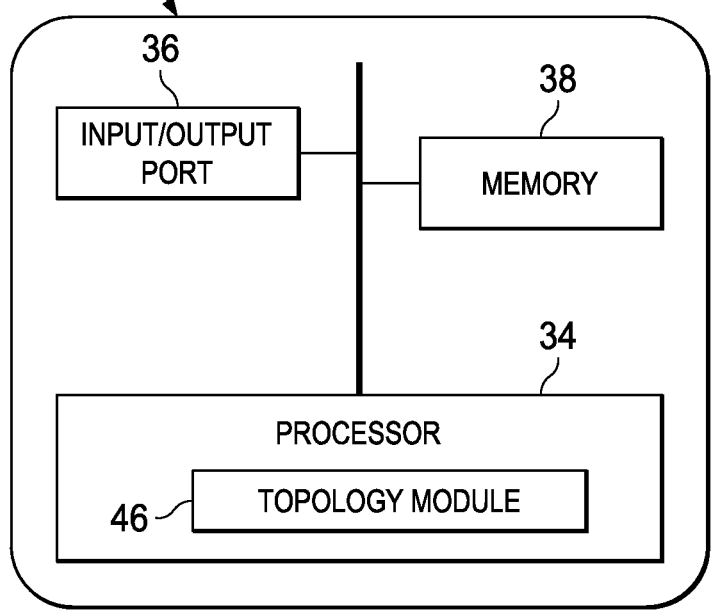
FIG. 4 is a simplified schematic of the base station of FIG. 1.

Referring now to FIG. 4, another network communications device 44 is illustrated. In an embodiment, the device 44 is the base station 18 illustrated in FIGS. 1-2. The device 44 includes many components that are similar to those found in device 32. In such cases, like reference numerals have been used to refer to like components. For example, the device 44 includes the processor 34, memory 38, and the I/O port 36. Because these components generally function in the same manner as noted above, they have not been described again in detail.

Still referring to FIG. 4, the device 44 includes a topology module 46 in the processor 34. In an embodiment, the topology module 44 is employed to process topology information received from the core network 28. In addition, the topology module 44 identifies a suitable neighbor mobile station based on the topology information received from the core network 28 or the access network (e.g., the base station 18).

The topology module 44 may consider numerous factors in making an assessment of a suitable, or the most suitable, neighbor mobile station 14 such as, for example, the proximity of the neighbor to the target, the secondary connection type available, the quality of the secondary connection, security of the secondary connection, the type and quality of the primary connection existing or that can be established with the neighbor, and so forth. The topology module 44 is also able to initiate transmission of the notification to the neighbor mobile station 14 over the primary connection 20.

Figure 5:
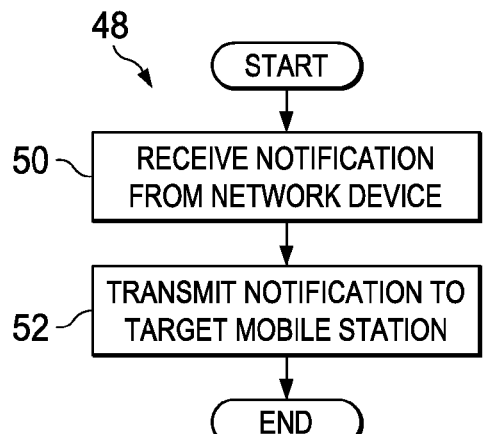
FIG. 5 is a method of using a neighbor mobile station from FIG. 1, which is connected to the base station over the primary connection, to notify the target mobile station, which is temporarily out of communication with the base station over the primary connection.

FIG. 5 illustrates a method 48 of using the neighbor mobile station 14, which is connected to the base station 18 over the primary connection 20, to notify the target mobile station 12, which is temporarily out of communication with the network device 18 over the primary connection 20. In block 50, the notification is received from the network device (e.g., the base station 18) over the primary connection 20. The notification indicates that data is available for the target mobile station 12.

In block 52, the notification is transmitted to the target mobile station 12 over the secondary connection 22. The notification requests, instructs, or permits the target mobile station 12 to establish communication with the network device over the primary connection 20 in order to receive the data.

Figure 6:
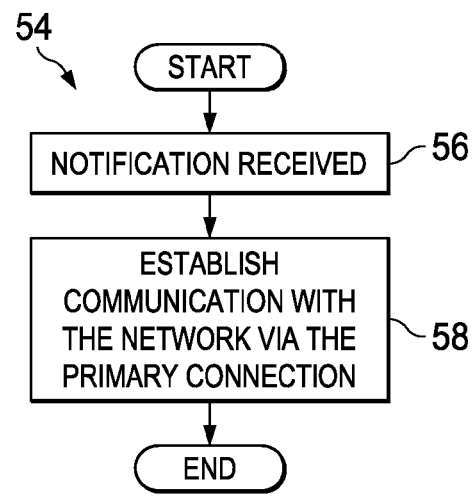
FIG. 6 is a method of the target mobile station of FIG. 1 receiving notice from the neighbor mobile station while the target base station is temporarily out of communication with the network device over the primary connection.

FIG. 6 illustrates a method 54 of the target mobile station 12 receiving notice from the neighbor mobile station 14 while the target base station 12 is temporarily out of communication with the network device (e.g., the base station 18) over the primary connection 20. In block 56, the notification is received from the neighbor mobile station 14 over a secondary connection 22. The notification indicates that data is available for the target mobile station 12. In block 58, the target mobile station 12 establishes communication with the network device over the primary connection 20 based on the notification in order to receive the data.

Figure 7:
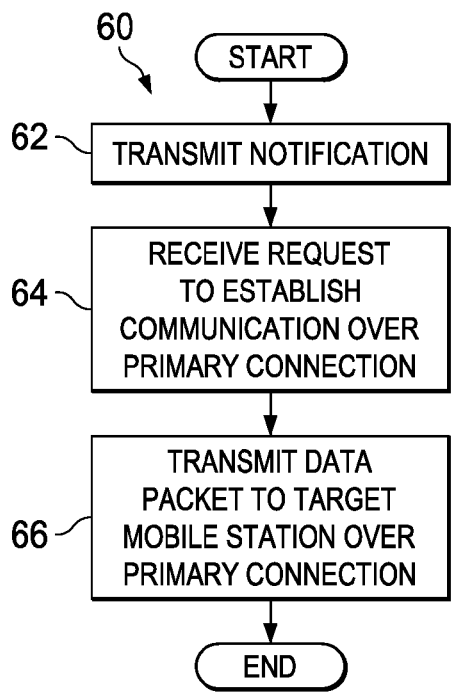
FIG. 7 is a method of the base station of FIG. 1 notifying the target mobile station, which is temporarily out of communication over the primary connection, using the neighbor mobile station.

FIG. 7 illustrates a method 60 of the base station 18 (or another network device) notifying the target mobile station 12, which is temporarily out of communication over the primary connection 20, using the neighbor mobile station 14, which has a current communication path established over the primary connection 20. In block 62, a notification is transmitted to the neighbor mobile station 14 over the primary connection 20. The notification instructs the neighbor mobile station 14 to relay the notification to the target mobile station 12 through the secondary connection 22. In an embodiment, the notification also indicates that data is available for the target mobile station 12.

In block 64, the base station 18 receives a request from the target mobile station 12 to establish communication over the primary connection 20 in order to transfer the data. The request is based on the notification delivered to the target mobile station 12 by the neighbor mobile station 12 through the secondary connection 22. In an embodiment, in base station 18 establishes communication with the target mobile station 12 over the primary connection 20 and the data packet is delivered to the target mobile station 12.

The present disclosure describes a number of advantageous features and aspects. For example, a method stores topology information containing both the primary and the secondary connections and make such topology available to the core network (or access network). Also, a method allows the core network (or access network) to contact a mobile station disconnected on the primary connection but connected on the secondary link, and another method allows the network to forward a notification (i.e., an indication) to the target mobile station via a neighboring mobile station.

In addition to the above, a method allows the identification of the target mobile station in the notification packet by its identification, and another method allows the notification to contain priority information. Further, a method allows the target mobile station to connect to the base station on the primary connection upon receiving notification on the secondary connection, and another method allows the network to buffer data until the target mobile station connects to the network. Still further, a method allows the topology information to be configured at the core network or at the access point, and another method allows the topology information to be pushed from the core network to the access network (e.g., the base station or similar access device).

Although embodiments described hereinabove operate within the specifications of a cellular communication network such as a 3GPP-LTE cellular network, other wireless communication arrangements are contemplated within the broad scope of an embodiment, including WiMAX, GSM, Wi-Fi, and other wireless communication systems.

It is noted that, unless indicated otherwise, functions described herein can be performed in either hardware or software, or some combination thereof, with or without human intervention. In an embodiment, the functions are performed by a processor such as a computer or an electronic data processor in accordance with code such as computer program code, software, and/or integrated circuits that are coded to perform such functions, unless indicated otherwise.

While the disclosure has been made with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method of notifying a target mobile station, the target mobile station temporarily out of communication with a network device on a primary connection, the method comprising:
   receiving, by a neighbor mobile station, a notification from the network device over the primary connection, the notification indicating that data is available for the target mobile station; and
   transmitting, by the neighbor mobile station, the notification to the target mobile station over a secondary connection, the notification requesting that the target mobile station establish communication with the network device over the primary connection in order to receive the data.

2. The method of claim 1, wherein the receiving further comprises receiving the notification through a cellular connection.

3. The method of claim 1, wherein the receiving further comprises receiving the notification from a base station.

4. The method of claim 1, wherein the receiving further comprises receiving the notification over a data channel of the primary connection.

5. The method of claim 1, wherein the receiving further comprises receiving the notification over a paging channel of the primary connection.

6. The method of claim 1, wherein the transmitting further comprises transmitting the notification to the target mobile station over the secondary connection operating on an unlicensed band.

7. The method of claim 1, wherein the transmitting further comprises transmitting the notification to the target mobile station over the secondary connection operating through a powerline connection.

8. The method of claim 1, wherein the transmitting further comprises transmitting the notification to the target mobile station over the secondary connection operating through a wireless fidelity (WiFi) connection.

9. A method of a target mobile station receiving notice from a neighbor mobile station, while the target mobile station is temporarily out of communication with a network device on a primary connection, the method comprising:
   receiving a notification from the neighbor mobile station over a secondary connection, the notification indicating that data is available for the target mobile station;
   establishing communication with the network device over the primary connection in accordance with the notification; and
   receiving the data over the primary connection.

10. The method of claim 9, wherein the step of receiving further comprises receiving the notification over the secondary connection operating on an unlicensed band.

11. The method of claim 9, wherein the receiving further comprises receiving the notification over the secondary connection operating through a powerline connection.

12. The method of claim 9, wherein the receiving further comprises receiving the notification over the secondary connection operating through a wireless fidelity (WiFi) connection.

13. The method of claim 9, further comprising receiving the data over the primary connection after the step of establishing communication.

14. A method of using a neighbor mobile station to notify a target mobile station, the target mobile station temporarily out of communication on a primary connection, the method comprising:
transmitting a notification to the neighbor mobile station over the primary connection, the notification instructing the neighbor mobile station to relay the notification to the target mobile station through a secondary connection and indicating that data is available for the target mobile station; and
receiving a request from the target mobile station to establish communication over the primary connection in order to transfer the data, the request in accordance with the notification delivered to the target mobile station by the neighbor mobile station through the secondary connection.

15. The method of claim 14, wherein the transmitting further comprises transmitting the notification using a cellular connection.

16. A wireless communications device, comprising:
an input/output port configured to provide data to a processor;
a memory configured to store the data received via the input/output port; and
the processor configured to process a notification received from a neighbor device over a secondary connection while a network device is temporarily out of communication over a primary connection and to initiate a request for communication with the network device over the primary connection in response to the notification received.

17. The device of claim 16, wherein the primary connection is a cellular connection and the secondary connection is unlicensed band connection.

18. The device of claim 16, further comprising a sensor configured to sense an event.

19. A wireless communications device, comprising:
an input/output port configured to provide data to a processor;
a memory configured to store the data received via the input/output port; and
the processor configured to identify a mobile station suitable for relaying a notification to a target mobile station over a secondary connection while the target mobile station is temporarily out of communication over a primary connection and in accordance with topology information received via the input/output port and to initiate transmission of the notification to the mobile station over the primary connection.

20. The device of claim 19, wherein the primary connection is a cellular connection and the secondary connection is unlicensed band connection.

* * * * *